United States Patent
Zhong et al.

(10) Patent No.: US 8,726,391 B1
(45) Date of Patent: May 13, 2014

(54) SCHEDULING MALWARE SIGNATURE UPDATES IN RELATION TO THREAT AWARENESS AND ENVIRONMENTAL SAFETY

(75) Inventors: Gary Zhong, Los Angeles, CA (US); Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1191 days.

(21) Appl. No.: 12/249,801

(22) Filed: Oct. 10, 2008

(51) Int. Cl.
*G06F 21/00* (2013.01)

(52) U.S. Cl.
USPC ............................................................ 726/25

(58) Field of Classification Search
CPC ...................... H04L 63/1416; H04L 67/1057
USPC ............................................................ 726/25
See application file for complete search history.

(56) References Cited

U.S. PATENT DOCUMENTS

| | | | |
|---|---|---|---|
| 5,440,723 A * | 8/1995 | Arnold et al. .................. 714/2 |
| 5,987,524 A | 11/1999 | Yoshida et al. | |
| 6,055,637 A | 4/2000 | Hudson et al. | |
| 6,073,242 A | 6/2000 | Hardy et al. | |
| 6,393,484 B1 | 5/2002 | Massarani | |
| 6,490,679 B1 | 12/2002 | Tumblin et al. | |
| 6,499,110 B1 | 12/2002 | Moses et al. | |
| 7,039,701 B2 * | 5/2006 | Wesley .................. 709/224 |
| 7,185,359 B2 | 2/2007 | Schmidt et al. | |
| 7,213,047 B2 * | 5/2007 | Yeager et al. ............. 709/202 |
| 7,269,851 B2 * | 9/2007 | Ackroyd ................... 726/24 |
| 7,302,706 B1 * | 11/2007 | Hicks et al. ............... 726/24 |
| 7,308,496 B2 * | 12/2007 | Yeager et al. ............. 709/224 |
| 7,337,224 B1 | 2/2008 | Van Horne, III et al. | |
| 7,360,237 B2 | 4/2008 | Engle et al. | |
| 7,370,358 B2 * | 5/2008 | Ghanea-Hercock .......... 726/23 |
| 7,496,348 B2 * | 2/2009 | Srey et al. ................ 455/410 |
| 7,512,809 B2 * | 3/2009 | Peikari .................... 713/188 |
| 7,571,214 B2 * | 8/2009 | Schiavone et al. .......... 709/207 |
| 7,617,533 B1 * | 11/2009 | Hernacki ................... 726/22 |
| 7,665,126 B2 * | 2/2010 | Simon et al. ................ 726/6 |
| 7,694,343 B2 * | 4/2010 | Sobel et al. ................ 726/27 |
| 7,712,138 B2 * | 5/2010 | Zobel et al. ................ 726/25 |
| 7,748,038 B2 * | 6/2010 | Olivier et al. .............. 726/24 |
| 7,774,845 B2 * | 8/2010 | Shipman ................... 726/23 |
| 7,805,518 B1 * | 9/2010 | Kamvar et al. ............. 709/227 |
| 7,805,759 B2 * | 9/2010 | Tang et al. ................ 726/22 |
| 7,865,956 B1 * | 1/2011 | Cambridge et al. .......... 726/24 |

(Continued)

OTHER PUBLICATIONS

PowerTrust: A Robust and Scalable Reputation System for Trusted Peer-to-Peer Computing; Runfang Zhou, and Kai Hwang; IEEE Transactions on Parallel and Distributed Systems, vol. 18, No. 4, Apr. 2007.*

(Continued)

*Primary Examiner* — Luu Pham
*Assistant Examiner* — James Turchen
(74) *Attorney, Agent, or Firm* — Fenwick & West LLP

(57) ABSTRACT

Information is received from a set of peer clients associated with a client, the information indicating likelihoods of peer client exposure to malware threats. An environmental safety score associated with the client is determined based, at least in part, on the information received from the set of peer clients, wherein the environmental safety score indicates a likelihood that the client is exposed to malware threats. A set of malware signatures is retrieved from the server at a time determined responsive to the environmental safety score and stored.

16 Claims, 6 Drawing Sheets

(56) References Cited

U.S. PATENT DOCUMENTS

| | | | |
|---|---|---|---|
| 7,908,660 B2 * | 3/2011 | Bahl | 726/25 |
| 7,913,303 B1 * | 3/2011 | Rouland et al. | 726/23 |
| 7,991,902 B2 * | 8/2011 | Cross et al. | 709/229 |
| 8,091,134 B2 * | 1/2012 | Benton et al. | 726/24 |
| 8,214,272 B2 * | 7/2012 | Glassman et al. | 705/35 |
| 8,266,284 B2 * | 9/2012 | Iverson | 709/225 |
| 8,312,545 B2 * | 11/2012 | Tuvell et al. | 726/24 |
| 8,438,499 B2 * | 5/2013 | Dixon et al. | 715/809 |
| 8,595,282 B2 * | 11/2013 | Nachenberg | 709/200 |
| 2002/0025031 A1 | 2/2002 | Maeda et al. | |
| 2002/0078377 A1 | 6/2002 | Chang et al. | |
| 2005/0091538 A1 * | 4/2005 | Hoche et al. | 713/201 |
| 2005/0188268 A1 | 8/2005 | Verbowski et al. | |
| 2006/0015722 A1 | 1/2006 | Rowan et al. | |
| 2006/0130139 A1 * | 6/2006 | Sobel et al. | 726/22 |
| 2006/0230437 A1 | 10/2006 | Alexander Boyer et al. | |
| 2006/0259960 A1 | 11/2006 | Kondo | |
| 2007/0094491 A1 * | 4/2007 | Teo et al. | 713/153 |
| 2007/0101405 A1 | 5/2007 | Engle et al. | |
| 2007/0143851 A1 | 6/2007 | Nicodemus et al. | |
| 2009/0119681 A1 * | 5/2009 | Bhogal et al. | 719/318 |

OTHER PUBLICATIONS

A Protocol for Reputation Management in Super-Peer Networks; Shalendra Chhabra, Ernesto Damiani, Sabrina De Capitani di Vimercati, Stefano Paraboschi, Pierangela Samarati; Proceedings of the 15th International Workshop on Database and Expert Systems Applications (DEXA'04), IEEE.*

Langston, R., "Network Access Control Technologies and Sygate Compliance on Contact," Sygate Technologies, Inc., 2005, [online] [Retrieved on Jul. 31, 2006] Retrieved from the Internet<URL:http://www.softwarespectrum.com/symantec/docs/WP-Sygate-Network-Access-Control.pdf>.

Archive of "BigFix® Closes the "Scan & Block" Remediation Gap with Expanded Endpoint Security Offerings," BigFix, Inc., Oct. 7, 2004, www.bigfix.com, [online] Archived by http://archive.org on Mar. 15, 2006; Retrieved on Mar. 27, 2012] Retrieved from the Internet<URL:http://web.archive.org/web/20060315071140/http://www.bigfix.com/press/news/pr_100704.html.

* cited by examiner

SCHEDULING MALWARE SIGNATURE UPDATES IN RELATION TO THREAT AWARENESS AND ENVIRONMENTAL SAFETY

BACKGROUND OF THE INVENTION

1. Field of the Invention

This invention pertains in general to computer security and in particular to the scheduling of updates of malicious software definitions.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Many security computer systems and software for counteracting malware operate by seeking to identify malware using malware signatures. Malware signatures, also called malware "definitions", contain data describing characteristics of known malware and can be used to determine whether an entity such as a computer file or a software application contains malware. Typically, malware signatures are generated by a provider of security software and provided to security software on a client computer. The malware signatures are then used by the security software to scan the client computer for malware.

As new malware threats are continuously being developed by attackers and deployed to computing environments, providers of the security software generate new malware signatures on a continuous basis. Providers of the security software generate hundreds of new malware signatures as often as every five minutes. The security software on the clients can then access a server maintained by the provider of the security software on which the newly generated malware signatures are stored to update their set of malware signatures with the newly-generated signatures. The security software uses the updated sets of malware signatures to scan the clients for new malware threats.

Updating the sets of malware signatures on the client requires the expense of computational resources from both the client and the server. The clients incur the expense of resources used in updating the set of malware signatures and re-scanning the clients with the updated set of malware signatures. The server incurs the expense of the computational resources associated with the network traffic caused by hundreds or thousands of clients simultaneously accessing the server to retrieve the set of malware signatures.

Often, this expense of computational resources can be avoided. While clients that are exposed to a large number of threats should update their signature set as often as possible, many clients have minimal exposure to threats and can afford to update their signature set on a less frequent basis without increased risk of undetected malware threat attacks. However, it is difficult to assess the frequency at which clients require malware signature set updates in order to prevent undetected malware threat attacks.

Accordingly, better methods of determining a client's likelihood of exposure to malware threats are required in order to better schedule updates of malware signature sets.

BRIEF SUMMARY

The above and other needs are met by systems, methods, and computer program products for retrieving a set of malware signatures.

One aspect provides a computer-implemented method for retrieving a set of malware signatures. Information is received from a set of peer clients associated with a client, the information indicating likelihoods of peer client exposure to malware threats. An environmental safety score associated with the client is determined based, at least in part, on the information received from the set of peer clients, wherein the environmental safety score indicates a likelihood that the client is exposed to malware threats. A set of malware signatures is retrieved from the server at a time determined responsive to the environmental safety score and stored.

Another aspect is embodied as a computer-readable storage medium encoded with computer program code for retrieving a set of malware signatures according to the above described method.

In another aspect, the described embodiments provide a computer system for retrieving a set of malware signatures according to the above described method.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
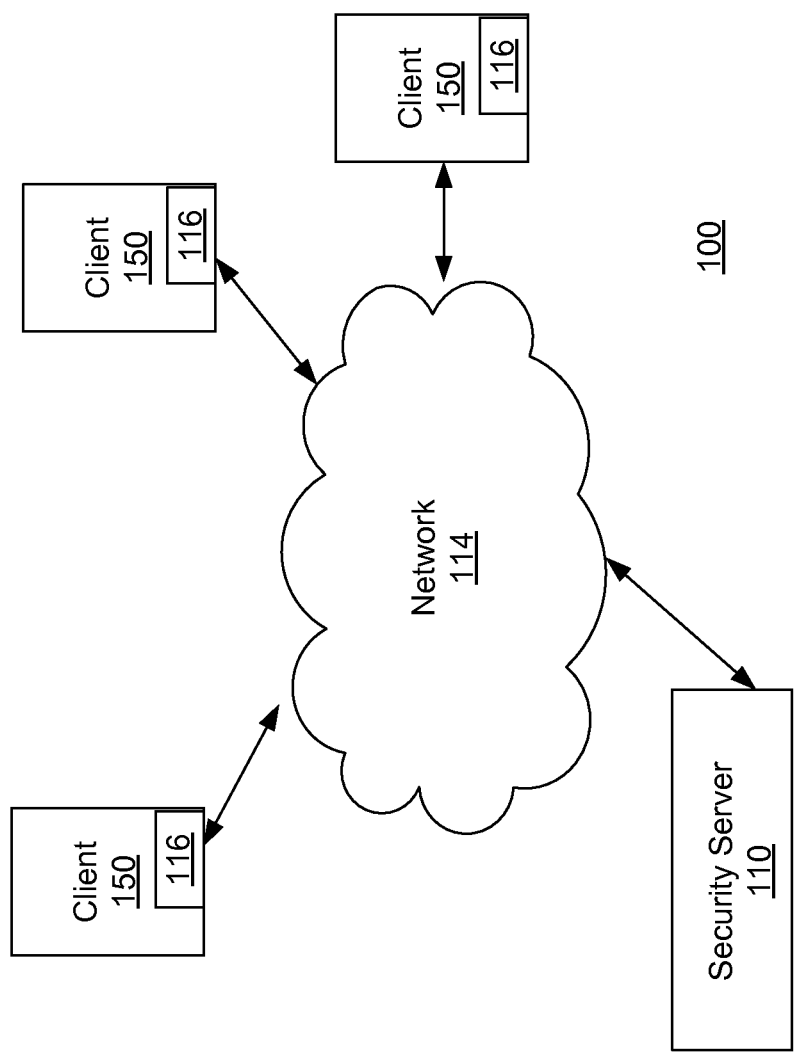
FIG. 1 is a high-level block diagram of a computing environment 100 according to one embodiment.

FIG. 1 is a high-level block diagram of a computing environment 100 according to one embodiment. FIG. 1 illustrates a security server 110 and three clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 provides malware signatures to the clients 150 in response to requests from the clients 150. In addition, the security server 110 can help clients 150 form sets of peer clients 150.

In one embodiment, a client 150 is a computer used by one or more users to perform activities including downloading, installing, and/or executing software applications. The client 150, for example, can be a personal computer executing a web browser such as MICROSOFT INTERNET EXPLORER that allows the user to retrieve and display content from web servers and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software applications or other entities that might constitute malware or other threats. For example, a client 150 can be a network gateway located between an enterprise network and the Internet.

The clients 150 interact with other clients through the network 114. The clients 150 that a particular client 150 interacts with through the network 114 are herein referred to as its "peer clients". The number and type of peer clients can vary in different embodiments. In one embodiment, the clients 150 are located at an enterprise such as a business or school and are connected by a local area network (LAN). The individual clients 150 recognize the other clients 150 connected to the LAN and self-organize into a set of peers. In another embodiment, the peer clients 150 register with the security server 110. The clients 150 receive address information for their peers from the security server 110. In some embodiments, the security server also organizes sets of clients 150 into peers based on characteristics of the clients and/or other criteria.

Each of the clients 150 executes a peer-based security engine 116. The peer-based security engine 116 generates a client safety score for the client 150 and reports the client safety score to each of its peer clients 150. The peer-based security engine 116 generates the client safety score based on information which indicates whether the client 150 is in a mode of operation which causes the client to be exposed to malware threats.

The peer-based security engine 116 further receives client safety scores from its peer clients 150. Based on the client's 150 own client safety score and the peer-reported client safety scores, the peer-based security engine 116 determines an environmental safety score for the client 150. The environmental safety score specifies the client's 150 relative likelihood of being exposed to malware based on its own mode of operation and its environment, where the environment is defined by the safety scores of its peer clients 150. Based on the likelihood of exposure to malware threats specified by the environmental safety score, the peer-based security engine 116 determines a time interval at which to contact the security server 110 to update its set of malware signatures.

The peer-based security engine 116 further functions to identify and report information associated with malware threat detection events. The peer-based security engine 116 uses the set of malware signatures provided by the security server 110 to identify malware threat detection events occurring at the client 150. The peer-based security engine 116 analyzes the malware threat detection events to determine information associated with the malware threat detection events. The peer-based security engine 116 transmits the information associated with the malware threat detection events to the peer-based security engines 116 executing on its peer clients 150. The peer-based security engine 116 further uses the information associated with peer-reported malware threat detection events in conjunction with the client safety score to determine the environmental safety scores and determined time interval.

This approach leverages information reported from peer clients 150 such as client safety scores and information associated with malware threat detection events in order to determine an environmental safety score indicating a client's 150 likelihood of exposure to malware threats. This approach is beneficial as it uses the environment of a client 150, as defined by its peer clients 150, as a proxy to determine the client's 150 likelihood of being exposed to malware threats. By using the environment of a client 150 as a proxy for the client 150, a likelihood of exposure to malware threats may be determined for the client 150 based on information external to the client 150. This allows for "preventative" assessment of the likelihood of exposure to malware threats at the client 150.

This approach further allows for the scheduling of signature set updates and malware scans on a "per need basis" using the environmental safety scores associated with the clients 150. By decreasing the frequency of malware signature set updates for clients 150 with environmental safety scores indicating a low likelihood of exposure to malware threats, the computational expense incurred by these clients 150 is reduced without additional risk of undetected malware threat attacks. Likewise, network traffic at the security server 110 is reduced by decreasing the frequency of signature updates for clients 150 with environmental safety scores indicating a low likelihood of exposure to malware threats. Conversely, increasing the frequency of malware signature updates for clients 150 associated with environmental safety scores indicating a high likelihood of exposure to malware threats provides increased ability to detect new malware threats.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
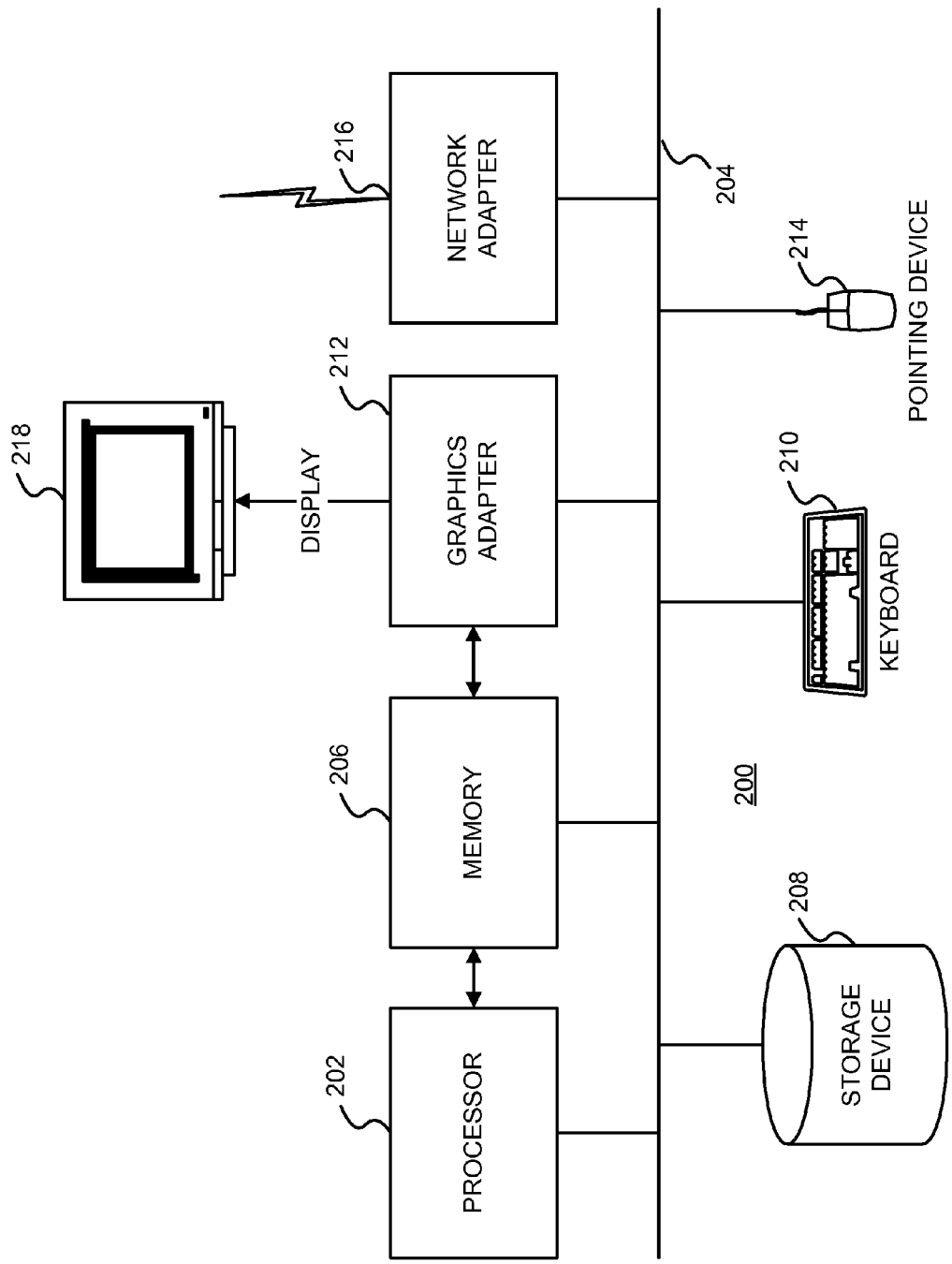
FIG. 2 is a high-level block diagram illustrating a typical computer for use as a security server 110 or a client 150.

FIG. 2 is a high-level block diagram illustrating a typical computer 200 for use as a security server 110 or client 150. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
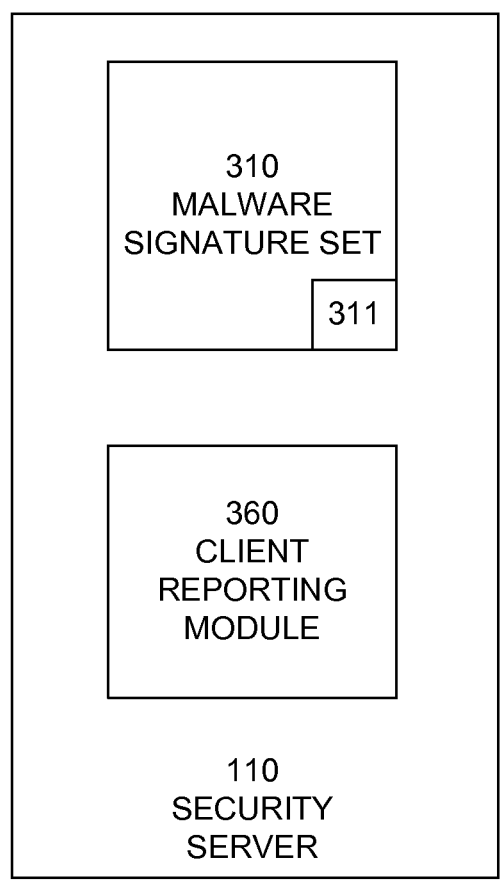
FIG. 3 is a high-level block diagram illustrating a detailed view of a security server 110 according to one embodiment.

FIG. 3 is a high-level block diagram illustrating a detailed view of the security server 110 according to one embodiment. As shown in FIG. 3, the security server 110 includes multiple modules. Those of skill in the art will recognize that other embodiments of the security server 110 can have different and/or other modules than the ones described here, and that the functionalities can be distributed among the modules in a different manner.

The malware signature set 310 contains a set of malware signatures. A malware signature is a characteristic that is used to uniquely identify an entity that is malware. These characteristics can include, for example: hashes identifying an entity, metadata associated with an entity, patterns found within an entity, patterns found in memory after an entity is executed and behaviors that can be used to recognize an entity. The number of malware signatures in the signature set 310 may range from hundreds of malware signatures to millions of malware signatures. The malware signature set 310 contains malware signatures developed by security software developers, automated processes and/or a combination of computational and manual methods. The malware signature set 310 is updated on a continuous basis to include new malware signatures.

The malware signature set 310 can be stored in any way on the security server 110, for example, as a file or database. In some embodiments, the signature set 310 will include information regarding the type and/or severity of malware threat that they have been generated to identify. In one embodiment, the newly generated malware signatures are stored in a separate file 311 or "delta". In some embodiments, the signature set 310 is stored as a file and may be updated to incorporate the deltas on a periodic basis (e.g. once a day).

The server reporting module 360 communicates with the clients 150 via the network 114. The client reporting module 360 transmits the malware signature sets 310, and/or deltas 311, to the clients 150. According to the embodiment, the server reporting module 360 may transmit the malware signature set 310 and/or deltas 331, on a periodic basis or whenever the client 150 requests an updated malware signature set 310. In some embodiments, the server reporting module 360 receives information from the clients 150 such as information associated with malware threat detection events.

Figure 4:
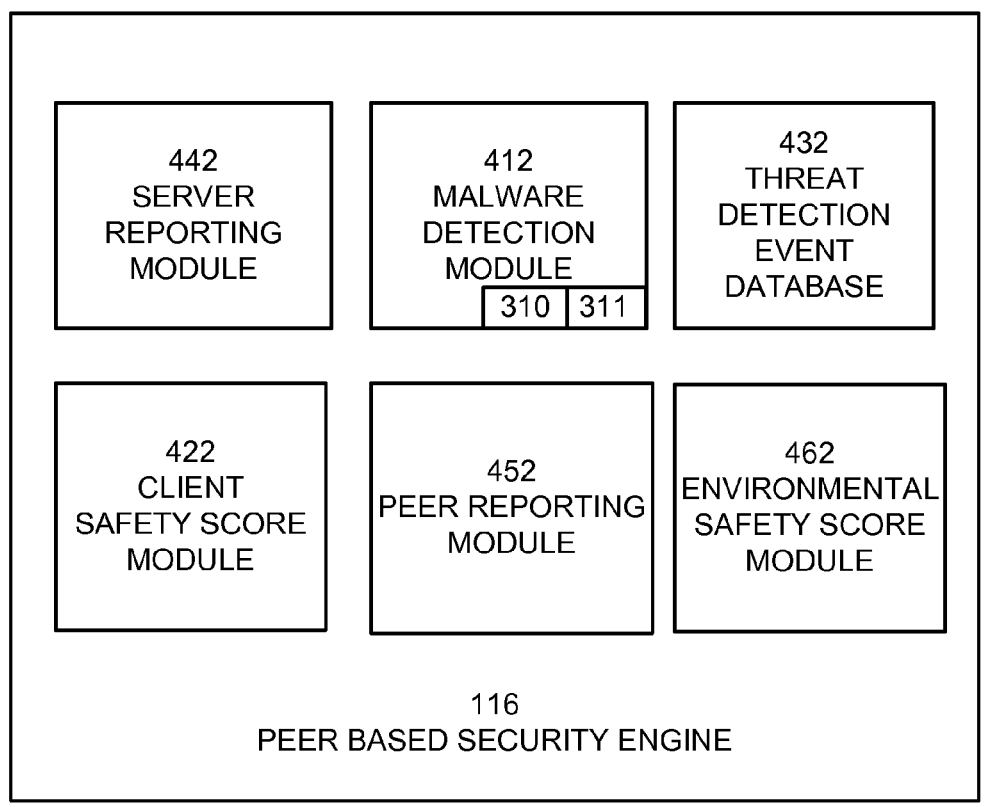
FIG. 4 is a high-level block diagram illustrating a detailed view of a peer-based security engine 116 according to one embodiment.

FIG. 4 is a high-level block diagram illustrating a detailed view of the peer-based security engine 116 according to one embodiment. In some embodiments, the peer-based security engine 116 is incorporated into an operating system executing on the client 150 while in other embodiments the peer-based security engine 116 is a standalone application or part of another product. As shown in FIG. 4, the peer-based security engine 116 includes several modules. Those of skill in the art will recognize that other embodiments of the peer-based security engine 116 can have different and/or other modules than the ones described here, and that the functionalities can be distributed among the modules in a different manner. In addition, the functions ascribed to the peer-based security engine 116 can be performed by multiple clients 150.

The client safety score module 422 determines a client safety score for the client 150 based on information indicating a mode of operation associated with the client 150. The information indicating the mode of operation associated with the client indicates whether the client is being operated in an unsafe mode which causes the client 150 to be exposed to malware threats. In one embodiment, information indicating the mode of operation associated with the client 150 includes reputation information associated with software applications found (or "stored") in memory 206 or storage devices 208 associated with the client 150. In this embodiment, finding a large number of software applications having unknown reputations causes the client safety score module 422 to determine that the client 150 is operating in an unsafe mode. This finding indicates that the user of the client 150 is being operated to download a large number of applications which are not well recognized or trusted, causing the client 150 to have a greater likelihood of being exposed to malware threats.

In another embodiment, information indicating the mode of operation associated with the client 150 includes a value indicating a ratio between the number of malware threat detection events identified on the client 150 and the number of software applications found in memory 206 or storage devices 208 associated with the client 150. Using this ratio allows for the normalization of the number of malware threat detections by the number of software applications found on the client. For instance, a client 150 may have a large number of malware threats detection events but this number may be relatively low compared to the number of software applications on the client, indicating a lower likelihood of exposure to malware threats. In this embodiment, a high ratio of malware threat detections to software applications causes the client safety score module 422 to determine that the client 150 is operating in an unsafe mode of operation.

Information indicating the mode of operation associated with the client 150 can further include: information indicating security settings associated with software applications the client 150 is running (e.g. web browser security settings), security software applications and/or patches installed on the client 150 and web sites the client 150 accesses that are known to be associated with malware threats. The client safety score module 433 may further determine a client safety score for the client 150 based on information associated with malware threat detection events identified by the malware threat detection module 412 such as the type and/or severity of the malware threat detected in the malware threat detection event.

Based on the information indicating the mode of operation associated with the client 150, the client safety score module 422 determines a client safety score specifying the likelihood that the client 150 is exposed to malware threats. According to the embodiment, the client safety score module 422 can combine the information indicating the mode of operation associated with the client 150 in any way to determine the client safety score. In one embodiment, the client safety score module 422 determines the client safety score by subtracting a value from the client safety score based on any type of information that indicates the client 150 is operating in an unsafe mode.

According to the embodiment, the client safety score module 422 may generates different client safety scores within different pre-determined ranges of values. In a specific environment, the client safety score is a continuous score ranging from 1 to 5, wherein a score of 1 indicates that the client is operating in a mode of operation having a low likelihood of exposure to malware threats and a score of 5 indicates the client is operation in a mode having a high likelihood of exposure to malware threats.

The client safety score module 422 may determine client safety scores for the client 150 on a continuous basis, a periodic basis (e.g. daily, hourly), whenever changes occur in the information indicating mode of operation associated with the client 150 or whenever new information indicating the client's 150 mode of operation is identified. The client safety score module 422 reports the client safety score to the peer reporting module 452.

The malware detection module 412 identifies malware threat detection events based on the malware signature set 310 retrieved from the security server 110 by the signature update module 442. The malware detection module 412 scans the storage device 208 or memory 206 associated with the client 150 to identify information associated with entities such as files or software applications that are installed or stored on the storage device 208 or memory 206. The malware detection module 412 determines whether the information associated with the entities corresponds to characteristics specified by signatures in the malware signature set 310. The malware detection module 412 may conduct the scan at pre-determined time intervals and/or upon the occurrence of an event such as the receipt of signature updates, detection of new entities, and a request by a user of the client 150.

A malware threat detection event occurs when data in the information associated with an entity corresponds to the characteristics specified by a signature in the malware signature set 310. The malware detection module 412 reports the identified malware threat detection event to the peer threat evaluation module 422. The malware detection module 412 further quarantines the malware threat identified in the malware threat detection event for analysis by the peer threat evaluation module 422. The malware threat may be quarantined, for example, by configuring the client 150 to prohibit execution of the malware threat and/or taking other actions to prevent any malicious code in the malware threat from causing harm. In some embodiments, the malware detection module 412 further remediates the client 150 responsive to the malware threat detection event, for example by removing the malware threat and/or repairing corrupted entities on the client.

The threat evaluation module 422 analyzes malware threat detection events identified by the malware detection module 412. The threat evaluation module 422 identifies information including a date stamp associated with the malware signature used in the malware threat detection event and a level of severity associated with the malware threat detected in the malware threat detection event. In one embodiment, the threat evaluation module 422 identifies the type and/or severity of the malware threat based on information associated with the signature used in the malware threat detection event.

In other embodiments, the threat evaluation module 422 determines the level of severity based on a determination of the systems affected by the malware threat, instructions associated with the malware threat and statistics indicating the number of detections of the malware threat. In a specific embodiment, the threat evaluation module 422 determines the level of severity using emulation-based techniques. In this embodiment, the threat evaluation module 422 emulates the malware threat behavior by executing the malware threat in a secure or "sandbox" environment and/or simulating the execution of the malware threat using machine instruction emulators. The threat evaluation module 422 monitors the actions performed by the malware threat and the decryption of instructions associated with the malware threat based on the emulation. The threat evaluation module 422 transmits the information associated with the malware threat detection event to the peer threat reporting module 452, the client safety score module 422 and the environmental safety score module 462.

The peer threat reporting module 452 identifies the set of peer clients 150 via the network or based on information provided by the security server 110. The peer threat reporting module 452 further communicates with the peer clients 150 via the network 114 to transmit and receive client safety scores and information associated with malware threat detection events. The peer threat reporting module 452 transmits client safety scores generated by the client safety score module 422 to the peer clients 150. The peer threat reporting module 452 transmits information associated with the malware threat detection events identified by the peer threat evaluation module 422 to its peer clients 150. The peer threat reporting module 452 receives information associated with the threat detection events from peer clients 150. The peer threat reporting module 452 transmits and receives client safety scores and information over the network 114 using a secure communication channel. In a specific embodiment, the threat information is transmitted over the network 114 using an Open Systems Interconnection Basic Reference Model (OSI model) and the threat information is transmit using a transport layer of the OSI model. In some embodiments, the peer threat reporting module 452 transmits information associated with the malware threat detection events, client safety scores and/or environmental safety scores to the security server 110.

The environmental safety score module 462 determines an environmental safety score based on client safety scores associated with peer clients 150 and information associated with malware threat detection events identified by peer clients. The environmental safety score module 462 also receives the client safety score associated with the local client 150 from the client safety score module 422. The environmental safety score module 462 further provides the environmental safety score to the signature update module 442.

The environmental safety score module 462 generates an initial environmental safety score based on the client safety score for the local client 150 and the peer-reported client safety scores. In one embodiment, the environmental safety score module 462 selects a client safety score from the client safety score for the client 150 and the set of peer-reported client safety scores that indicates the highest likelihood of exposure to malware threats as the environmental safety score. For example, if the client safety score for the client 150 is '5' and the set of peer-reported safety scores range from '2'-'3', then the environmental safety score module 462 selects '5' as the environmental safety score for the client 150. In another embodiment, the environmental safety score module 462 averages the set of peer-reported client safety scores and selects the highest of the client safety score associated with the client 150 and the average peer-reported client safety score as the environmental safety score. For example, if the client safety score for the client 150 is '1' and the average peer-reported safety scores is '3', then the environmental safety score module 462 selects '3' as the environmental safety score for the client 150. The environmental safety score module 462 iteratively re-determines the environmental safety score for the client 150 as new client safety scores are generated by the client safety score module 422 and new peer-reported client safety scores are received from the peer clients 150.

The environmental safety score module 462 can further determine the environmental safety scores based on information associated with malware threat detection events reported by the peer clients 150 or identified at the local client 150. For example, if the information associated with a malware threat detection event indicates that a severe or "high-risk" threat has been detected on the client 150 or a peer client 150, the environmental safety module 462 may elevate the environmental safety score to the maximum (highest risk) value. Likewise, if the information associated with the threat detection event indicates that a threat has been detected on the client 150 or a peer client 150 using a signature from a signature set 310 that is newer than the signature set 310 currently stored on the client 150, the environmental safety module 462 may elevate the environmental safety score to the maximum (highest risk) value.

The signature update module 442 communicates with the security server 110 via the network 114 to retrieve the signature set 310 based on the environmental safety score. The signature update module 442 receives the environmental safety score from the environmental safety score module 462. The signature update module 442 may receive the environmental safety score at a defined frequency (e.g. every five minutes) or whenever a change occurs in the environmental safety score. The environmental safety scores are associated with time intervals at which the signature update module 442 polls the security server 100 to retrieve the malware signature set. In one embodiment, the time interval may range from 5 minutes to 24 hours according to the environmental safety score. In a specific embodiment, environmental safety scores ranging from 1 to 5 are associated with time intervals as tabulated below:

| Environmental Safety Score | Time Interval |
| --- | --- |
| '1' (Extremely Low Likelihood of Exposure to Malware threats) | 24 hours |
| '2' (Low Likelihood of Exposure to Malware threats) | 12 hours |
| '3' (Average Likelihood of Exposure to Malware threats | 6 hours |
| '4' (High Likelihood of Exposure to Malware threats) | 1 hour |
| '5' (Extremely High Likelihood of Exposure to Malware threats) | 10 minutes |

The signature update module 442 polls the security server 110 to retrieve the malware signature set 310 according to the time interval associated with the environmental safety score. In some embodiments, the signature update module 442 may poll the security server 110 to retrieve the delta 311 of the malware signature set 310 if the time interval is less then a defined time interval (e.g. less than 1 hour). The signature update module 442 provides the malware signature set 310 to the malware detection module 412. In some embodiments, the signature update module 442 transmits threat information identified by the peer threat evaluation module 422 to the security server 110.

Figure 5A:
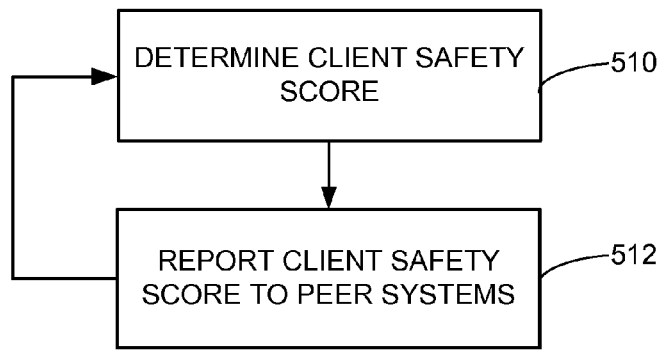
FIG. 5a is a flowchart illustrating steps performed by the peer-based security engine 116 to report client safety scores to peer clients 150 according to one embodiment.

FIG. 5a is a flowchart illustrating steps performed by the peer-based security engine 116 to report client safety scores to peer clients 150 according to one embodiment. Other embodiments perform the illustrated steps in different orders, and/or perform different or additional steps. Moreover, some of the steps can be performed by engines or modules other than the peer-based security engine 116.

The peer-based security engine 116 determines 510 a client safety score based on information indicating the mode of operation associated with the client 150. The peer-based security engine 116 reports 512 the client safety score to its peer clients 150.

Figure 5B:
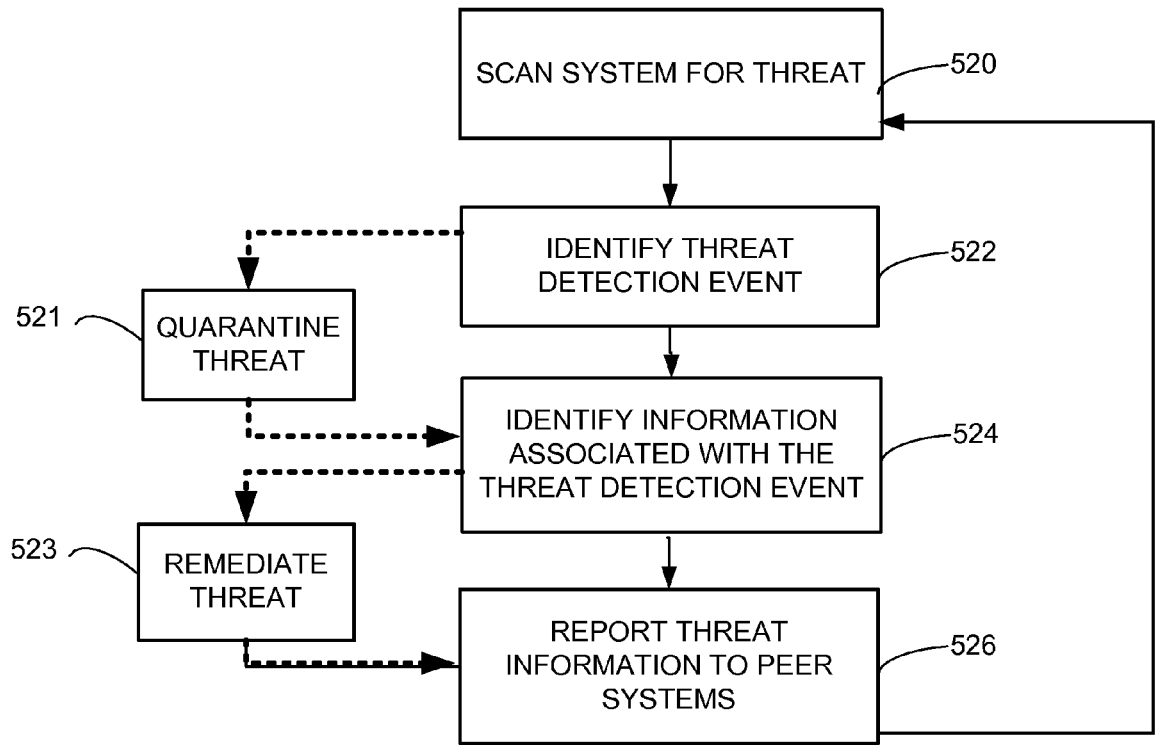
FIG. 5b is a flowchart illustrating steps performed by the peer-based security engine 116 on the client 150 to identify and report threat detection events according to one embodiment.

FIG. 5b is a flowchart illustrating steps performed by the peer-based security engine 116 on the client 150 to identify threat detection events according to one embodiment. Other embodiments perform the illustrated steps in different orders, and/or perform different or additional steps. Moreover, some of the steps can be performed by engines or modules other than the peer-based security engine 116.

The peer-based security engine 116 scans 520 the client 150 using the malware signature set 310 received from the security server 110. The peer-based security engine 116 identifies 522 a threat detection event based on the scanning 520. In some embodiments, the peer-based security engine 116 quarantines 521 the malware threat identified in the threat detection event. The peer-based security engine 116 identifies 524 information associated with the malware threat detection event. In some embodiments, the peer-based security engine 116 remediates 523 the client 150. The peer-based security engine 116 reports 526 the information associated with the threat detection event to peer clients 150.

Figure 6:
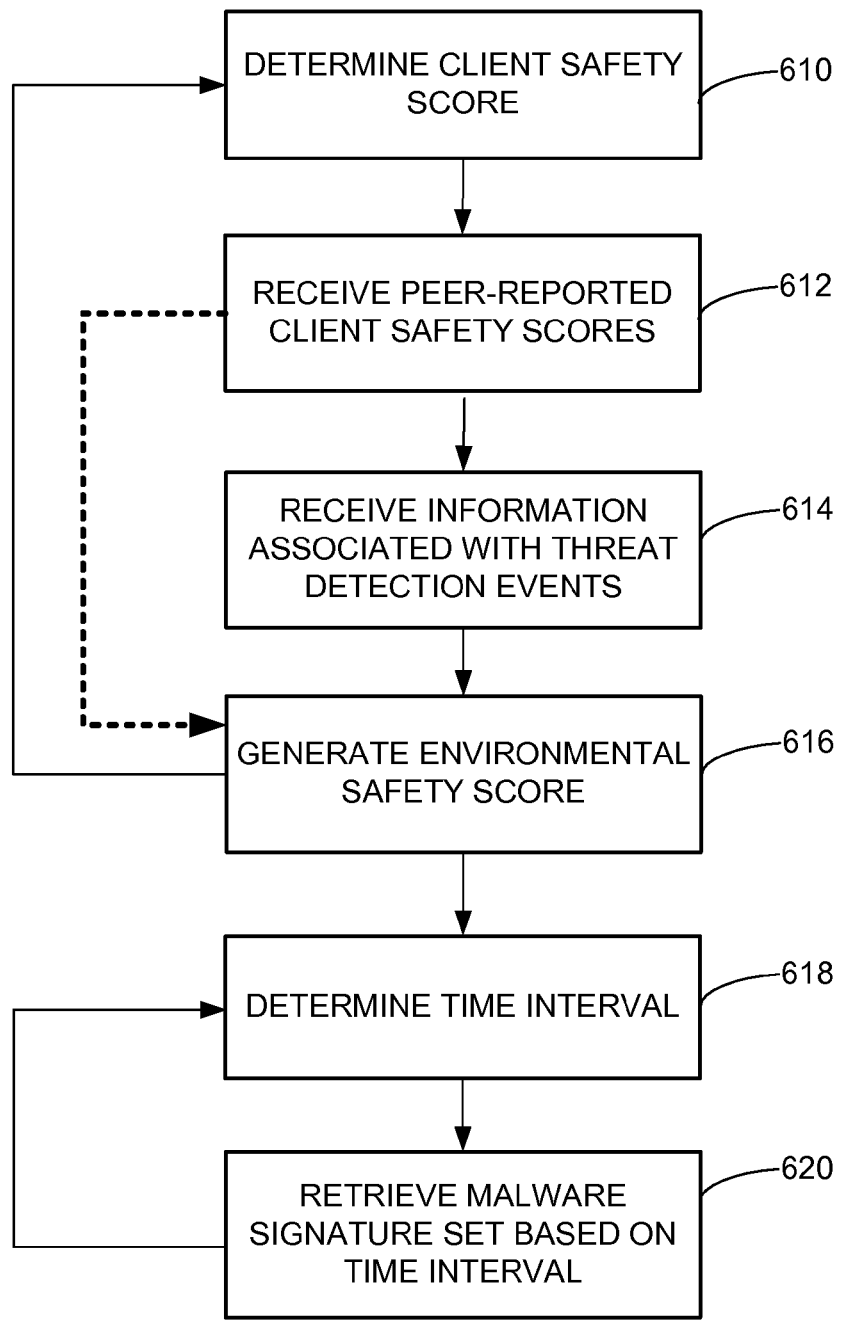
FIG. 6 is a flowchart illustrating steps performed by the peer-based security engine 116 to generate environmental safety scores and retrieve malware signature sets according to one embodiment.

FIG. 6 is a flowchart illustrating steps performed by the peer-based security engine 116 on the client 150 to generate environmental safety scores and retrieve malware signature sets 310 according to one embodiment. Other embodiments perform the illustrated steps in different orders, and/or perform different or additional steps. Moreover, some of the steps can be performed by engines or modules other than the peer-based security engine 116.

The peer-based security engine 116 determines 610 a client safety score for the client. The peer-based security engine 116 receives 612 peer-reported client safety scores from peer clients 150. Initially, the peer-based security engine 116 generates 616 an environmental safety score based on the client safety score associated with the client 150 and the peer reported client safety scores associated with the peer clients 150. The peer-based security engine 116 receives 614 information associated with threat detection events identified by the peer clients 150. The peer-based security engine 116 generates 616 environmental safety scores based on the received information associated with malware threat detection events. The peer-based security engine 116 iteratively generates 616 new environmental safety scores based on client safety scores, peer-reported client safety scores and peer-reported information associated with malware threat detection events.

Based on the generated environmental safety score, the peer-based security engine 116 determines 618 a time interval at which to update the malware signature set 310. The peer-based security engine 116 retrieves 620 the malware signature set 310 from the security server 110 according to the determined time interval. The peer-based security engine 116 may iteratively determine 618 the time interval at which to retrieve 620 the signature set on based on the newly generated environmental safety scores.

The above description is included to illustrate to a client 150 according to one embodiment. Other embodiments the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of retrieving a set of malware signatures comprising:
    receiving, at a client, client safety scores from a set of peer clients associated with the client, a client safety score for a peer client having a value indicating a mode of operation associated with the peer client, the value normalized as a ratio of a number of malware threat detections on the peer client to a number of software applications found on the peer client;
    calculating, by the client, an environmental safety score associated with the client based, at least in part, on the client safety scores received from the set of peer clients, wherein the environmental safety score indicates a likelihood that the client is exposed to malware threats;
    identifying a plurality of different time intervals respectively associated with a plurality of different environmental safety scores;
    selecting a time interval of the plurality of different time intervals associated with the calculated environmental safety score;
    retrieving a set of malware signatures from a server at a time determined responsive to the environmental safety score and the selected time interval; and
    storing the set of malware signatures.

2. The computer-implemented method of claim 1, wherein calculating the environmental safety score associated with the client based, at least in part, on the client safety scores received from the peer clients comprises:
    determining a client safety score associated with the client, wherein the client safety score indicates a likelihood of client exposure to malware threats; and
    calculating the environmental safety score associated with the client based, at least in part, on the client safety score associated with the client and the client safety scores received from the set of peer clients.

3. The computer-implemented method of claim 2, wherein calculating the environment safety score associated with the client based, at least in part, on the client safety score associated with the client and the client safety scores received from the set of peer clients comprises:
    selecting one of the client safety score associated with the client and a client safety score received from a peer client indicating a highest likelihood of exposure to malware threats as the environmental safety score.

4. The computer-implemented method of claim 1, wherein a length of the selected time interval associated with the calculated environmental safety score associated with the client is inversely proportional to the likelihood that the client is exposed to malware threats indicated by the environmental safety score.

5. The computer-implemented method of claim 1, further comprising:
    identifying a malware threat detection event at the client based on the retrieved set of malware signatures;
    determining a client safety score associated with the malware threat detection event; and
    providing the client safety score associated with the malware threat detection event to the peer client.

6. The computer-implemented method of claim 1, wherein the value of the client safety score is further based on a number of software applications stored at the peer client having unknown reputations.

7. The computer-implemented method of claim 1, wherein the value of the client safety score is further based on security settings of a browser stored at the peer client.

8. The computer-implemented method of claim 1, wherein the value of the client safety score is selected from a continuous range of scores.

9. A non-transitory computer-readable storage medium encoded with executable computer program code for retrieving a set of malware signatures, the program code comprising program code for:
    receiving, at a client, client safety scores from a set of peer clients associated with the client, a client safety score for a peer client having a value indicating a mode of operation associated with the peer client, the value normalized as a ratio of a number of malware threat detections on the peer client to a number of software applications found on the peer client;
    calculating, by the client, an environmental safety score associated with the client based, at least in part, on the client safety scores received from the set of peer clients, wherein the environmental safety score indicates a likelihood that the client is exposed to malware threats;
    identifying a plurality of different time intervals respectively associated with a plurality of different environmental safety scores;
    selecting a time interval of the plurality of different time intervals associated with the calculated environmental safety score associated with the client;
    retrieving a set of malware signatures from a server at a time determined responsive to the environmental safety score and the selected time interval; and
    storing the set of malware signatures.

10. The non-transitory computer-readable storage medium of claim 9, wherein program code for calculating the environmental safety score associated with the client based, at least in part, on the client safety scores received from the peer clients comprises program code for:
    determining a client safety score associated with the client, wherein the client safety score indicates a likelihood of client exposure to malware threats; and
    calculating the environmental safety score associated with the client based, at least in part, on the client safety score associated with the client and the client safety scores received from the set of peer clients.

11. The non-transitory computer-readable storage medium of claim 10, wherein program code for calculating the environment safety score associated with the client based, at least in part, on the client safety score associated with the client and the client safety scores received from the set of peer clients comprises:
    selecting one of the client safety score associated with the client and a client safety score received from a peer client indicating a highest likelihood of exposure to malware threats as the environmental safety score.

12. The non-transitory computer-readable storage medium of claim 9, wherein a length of the selected time interval associated with the calculated environmental safety score associated with the client is inversely proportional to the likelihood that the client is exposed to malware threats indicated by the environmental safety score.

13. The non-transitory computer-readable storage medium of claim 9, further comprising program code for:
   identifying a malware threat detection event at the client based on the retrieved set of malware signatures;
   determining a client safety score associated with the malware threat detection event; and
   providing the client safety score associated with the malware threat detection event to the peer client.

14. A computer system for retrieving a set of malware signatures, the system comprising:
   a processor for executing computer program code; and
   a computer-readable storage medium encoded with executable computer program code comprising:
   a peer reporting module adapted to receive, at a client, client safety scores from a set of peer clients associated with the client, a client safety score for a peer client having a value indicating a mode of operation associated with the peer client, the value normalized as a ratio of a number of malware threat detections on the peer client to a number of software applications found on the peer client;
   an environmental score module adapted to calculate, by the client, an environmental safety score associated with the client based, at least in part, on the client safety scores received from the set of peer clients, wherein the environmental safety score indicates a likelihood that the client is exposed to malware threats;
   a signature update module adapted to:
   identify a plurality of different time intervals respectively associated with a plurality of different environmental safety scores;
   select a time interval of the plurality of different time intervals associated with the calculated environmental safety score associated with the client;
   retrieve a set of malware signatures from a server at a time determined responsive to the environmental safety score and the selected time interval; and
   store the set of malware signatures.

15. The computer system of claim 14, further comprising a client safety score module adapted to determine a client safety score associated with the client, wherein the client safety score indicates a likelihood of client exposure to malware threats, wherein:
   the environmental score module is further adapted to calculate the environmental safety score associated with the client based, at least in part, on the client safety score associated with the client and the client safety scores received from the set of peer clients.

16. The computer system of claim 14, wherein the selected time interval associated with the calculated environmental safety score associated with the client is inversely proportional to the likelihood that the client is exposed to malware threats indicated by the environmental safety score.

\* \* \* \* \*